UNITED STATES PATENT OFFICE 2,233,128

PROCESS FOR THE MANUFACTURE OF BENZIDINE

Clyde O. Henke, Wilmington, Del., Roland George Benner, Carneys Point, N. J., and Robert C. W. Jones, Wilmington, Del., assignors to E. I. du Pont de Nemours & Company, Wilmington, Del., a corporation of Delaware No Drawing. Application November 8, 1939, Serial No. 303,474

4 Claims. (Cl. 260—569)

This invention relates to a process for the manufacture of benzidine and more particularly to the production of benzidine from nitrobenzene by catalytic hydrogenation in the liquid phase.

Benzidine has heretofore been produced on a commercial scale by reduction of nitrobenzene with zinc dust and caustic soda, and also by catalytic hydrogenation of nitrobenzene in the presence of a nickel catalyst and in an aqueous caustic soda medium, to hydrazobenzene, which is inverted to benzidine by dilute acids.

Although fairly good yields of benzidine are obtainable by the zinc reduction method, the cost of production has been high because of the high cost of zinc dust and the expense resulting from difficulties involved in separating the zinc sludge from the reduction mass.

Hydrogen has been found to be more economical for reduction of many nitro bodies to the amines than either of the older methods which involve the use of zinc or iron. However, in the case of the catalytic hydrogenation of nitrobenzene to benzidine the yields have been relatively low under practical operating conditions.

This invention has as an object an improved and economical process for the production of benzidine of high quality by hydrogen reduction of nitrobenzene. Other objects will be apparent from the reading of the following description of the invention.

These objects are accomplished by the following invention which comprises reducing nitrobenzene with hydrogen in the presence of an active noble metal catalyst and an alkaline medium and in an oxygen-containing, non-acidic, organic solvent having from 3 to 7 carbon atoms.

Nitrobenzene is catalytically hydrogenated to a mixture of hydrazobenzene, aniline, and a small amount of azobenzene by carrying out said hydrogenation at temperatures below 150° C., at hydrogen pressures above 1 atmosphere, in an oxygen-containing organic solvent having from 3 to 7 carbon atoms, in the presence of an active noble metal catalyst, and in an alkaline medium. The mixture is treated with hydrochloric acid and iron to convert the azo-hydrazo-benzene to benzidine hydrochloride and the aniline to its hydrochloride. The aniline hydrochloride is separated from the benzidine hydrochloride by filtration, converted to aniline by the addition of lime, and distilled. The benzidine hydrochloride is washed free of isomers, aniline, and solvent, and is converted to benzidine sulfate with sulfuric acid.

The following examples set forth certain well defined instances of the application of this invention. They are, however, not to be considered as limitations thereof, since many modifications may be made without departing from the spirit and scope of this invention.

Example I

In an iron autoclave equipped for rapid agitation are charged 100 parts of nitrobenzene, made from thiophene-free benzene, 50 parts of isopropanol, 3 parts of caustic soda, and 0.015 part of palladium black supported on activated carbon. The charge is hydrogenated at 80° to 85° C. and under 100 to 200 lbs. per sq. in. hydrogen pressure. The absorption of hydrogen is continued until it becomes very slow. The hydrogenated mass is then taken from the autoclave, the autoclave washed, and the washings combined with the mass. The charge is then cooled to 15° to 20° C. Water is added and the mixture is cooled to 0° to 5° C. While this temperature is maintained, 130 parts of 33% hydrochloric acid are added to invert the hydrazobenzene to benzidine hydrochloride. After agitating 4 hours at this temperature, the charge is warmed to 20° to 25° C. over a period of about 3 hours. 3 parts of iron powder are added and the charge is agitated for about 6 hours after which it becomes gray. 60 parts of salt are added. The benzidine hydrochloride is then filtered out and washed with 100 parts of cold 15% salt solution. The filtrate is made alkaline and is then steam-distilled to recover the isopropanol and aniline. The benzidine hydrochloride is dissolved in boiling water and is filtered at 100° to 101° C. The sludge is washed with boiling water, the filtrates being combined. While agitating, 50 parts of 50% sulfuric acid are slowly added over a period of 1 to 2 hours. The slurry of benzidine sulfate is cooled to 40° to 50° C., filtered, and washed free of acid. The resultant paste is of excellent quality, being relatively free of isomers, of benzidine sulfate, and of aniline, and contains about 40% benzidine sulfate.

Example II

In an iron autoclave equipped for rapid agitation are charged 100 parts of nitrobenze, 20 parts of isopropanol, 3 parts of caustic soda, and 0.015 part of palladium black supported on activated carbon. The charge is hydrogenated and the hydrogenated mass is converted to benzidine sulfate and aniline in a manner similar to Example I.

Example III

In an iron autoclave equipped for rapid agitation are charged 100 parts of nitrobenzene, 150 parts of the azeotropic mixture of isopropanol and water, 3 parts of caustic soda, and 0.025 part platinum black supported on activated carbon. The charge is hydrogenated and the hydrogenated mass is converted to benzidine sulfate and aniline in a manner similar to Example I.

Example IV

In an iron autoclave equipped for rapid agitation are charged 100 parts of nitrobenzene, 150 parts of the azeotropic mixture of isopropanol and water, 12 parts of caustic soda, and 0.025 part of palladium black supported on activated carbon. The charge is hydrogenated and the hydrogenated mass is converted to benzidine sulfate and aniline in a manner similar to Example I.

Example V

In an iron autoclave equipped for rapid agitation are charged 100 parts of nitrobenzene, 50 parts of n-propanol, 3 parts of caustic soda, and 0.030 part of palladium black supported on activated carbon. The charge is hydrogenated and the hydrogenated mass is converted to benzidine sulfate and aniline in a manner similar to Example I.

Example VI

In an iron autoclave equipped for rapid agitation are charged 100 parts of nitrobenzene, 50 parts of isobutanol, 3 parts of caustic soda, and 0.030 part of palladium black supported on activated carbon. The charge is hydrogenated and the hydrogenated mass is converted to benzidine sulfate and aniline in a manner similar to Example I.

Example VII

In an iron autoclave equipped for rapid agitation are charged 100 parts of nitrobenzene, 50 parts of secondary-butanol, 3 parts of caustic soda, and 0.030 part of palladium black supported on activated carbon. The charge is hydrogenated and the hydrogenated mass is converted to benzidine sulfate and aniline in a manner similar to Example I.

Example VIII

In an iron autoclave equipped for rapid agitation are charged 100 parts of nitrobenzene, 150 parts of tertiary-butanol, 6 parts of caustic soda, and 0.025 part of palladium black supported on activated carbon. The charge is hydrogenated and the hydrogenated mass is converted to benzidine sulfate in a manner similar to Example I.

Example IX

In an iron autoclave equipped for rapid agitation are charged 100 parts of nitrobenzene, 50 parts of tertiary-amyl alcohol, 3 parts of caustic soda, and 0.030 part of palladium black supported on activated carbon. The charge is hydrogenated and the hydrogenated mass is converted to benzidine sulfate and aniline in a manner similar to Example I.

Example X

In an iron autoclave equipped for rapid agitation are charged 100 parts of nitrobenzene, 50 parts of "Pentasol" (a commercial mixture of amyl alcohols), 3 parts of caustic soda, and 0.030 part of palladium black supported on activated carbon. The charge is hydrogenated and the hydrogenated mass is converted to benzidine sulfate and aniline in a manner similar to Example I.

Example XI

In an iron autoclave equipped for rapid agitation are charged 100 parts of nitrobenzene, 50 parts of acetone, 3 parts of caustic soda, and 0.030 part of palladium black supported on activated carbon. The charge is hydrogenated and the hydrogenated mass is converted to benzidine sulfate and aniline in a manner similar to Example I.

Example XII

In an iron autoclave equipped for rapid agitation are charged 100 parts of nitrobenzene, 50 parts of isopropanol, 3 parts of caustic soda, and 0.0075 part each of palladium black and of platinum black supported on activated carbon. The charge is hydrogenated and the hydrogenated mass is converted to benzidine sulfate and aniline in a manner similar to Example I.

Example XIII

In an iron autoclave equipped for rapid agitation are charged 100 parts of nitrobenzene, 50 parts of isopropanol, 3 parts of caustic soda, and 0.050 part of rhodium black supported on activated carbon. The charge is hydrogenated and the hydrogenated mass is converted to benzidine sulfate and aniline in a manner similar to Example I.

Example XIV

In an iron autoclave equipped for rapid agitation are charged 100 parts of nitrobenzene, 50 parts of isopropanol, 9 parts of ammonium hydroxide, containing 28 to 29% ammonia, and 0.030 part of palladium black supported on activated carbon. The charge is hydrogenated and the hydrogenated mass is converted to benzidine sulfate and aniline in a manner similar to Example I.

Example XV

In an iron autoclave equipped for rapid agitation are charged 100 parts of nitrobenzene, 50 parts of isopropanol, 45 parts of 94% sodium stearate, and 0.030 part of palladium black supported on activated carbon. The charge is hydrogenated and the hydrogenated mass is converted to benzidine sulfate and aniline in a manner similar to Example I.

This invention is not to be construed as limited to the particular conditions cited in the above examples.

The rate of reaction is greatly influenced by the temperature, higher temperatures increasing the reduction rate; but better yields are obtained within the range of 75° to 90° C. However, the hydrogenation may be carried out at from 30° to 150° C.

Hydrogen pressures of 50 to 300 lbs. per sq. in. are preferable but any pressure from atmospheric pressure to 2000 lbs. per sq. in. and higher may be employed, the construction of the equipment limiting the upper pressure.

The proportion of solvent to nitrobenzene is best kept between 15% and 3 times the weight of nitro body, but may be varied from 10% to 5 times the weight of nitrobenzene, the lower proportion resulting in more aniline formation but faster reduction. The solvent used need not be one of those mentioned in the examples cited although isopropanol is the most efficient. The solvent should be an oxygen-containing, non-acidic, organic compound of from 3 through 7 carbon atoms. This would include all aliphatic, cyclic, and aromatic alcohols, ketones, aldehydes, esters, and ethers of from 3 through 7 carbons. While ethers fall into this category, the hazards involved in their use make it inadvisable to employ them. Mixtures of the above solvents or materials resulting in the formation of them are included. Examples of these are: n-propanol, isopropanol, n-butanol, isobutanol, secondary-butanol, tertiary-butanol, n-amyl alcohol, iso-amyl alcohol, tertiary-amyl alcohol, fused oil, "Pentasol" (a commercial mixture of amyl alcohols), n-hexanol, cyclohexanol, benzyl alcohol, acetone, methyl ethyl ketone, diethyl ketone, propionaldehyde, butyraldehyde, etc.

The amount of catalyst employed is preferably between 0.005 and 0.050% of the weight of nitro body, but may be decreased as long as it shows activity, or increased, as desired. The use of more than 0.5% noble metal in the catalyst, based on the nitrobenzene, makes the process impractical due to the cost of the metal. The catalyst may be palladium black, platinum black or rhodium black, and is preferably prepared in accordance with U. S. application Serial No. 303,475, filed of even date herewith. However, noble metal compounds may be used, as well as mixtures or other physical forms of the metals, such as colloids and the like. They are preferably supported on activated carbon but they may be unsupported or supported on any inert carrier such as, for example, charcoal, kieselguhr, asbestos, fuller's earth, filtercel, bentonite, vermiculite, monox, silica, and the like. The catalyst may be recovered by filtering the autoclave charge or it may be filtered off with the unreacted iron after the inversion is complete.

The alkaline material is preferably from 2 to 12% of caustic soda based on the weight of nitrobenzene but the proportion may be varied from 0.5 to 50% or more of the weight of nitro body. The equivalent of any material resulting in an alkaline medium under the conditions employed may also be used. Lower alkalinity decreases the yield of benzidine; more alkaline material decreases the rate of reduction. The most common alkaline materials are the oxides, hydroxides, salts of weak acids, alcoholates, and phenolates of the alkali and of the alkaline earth metals, as well as strong organic bases or salts, various compounds of the nitrogen system, and various compounds of other metals such as magnesium. Examples of the above are: sodium hydroxide, potassium hydroxide, calcium hydroxide, barium hydroxide, strontium hydroxide, ammonium hydroxide, sodium carbonate, potassium carbonate, sodium oxide, potassium oxide, calcium oxide, barium oxide, strontium oxide, sodium acetate, potassium acetate, calcium acetate, barium acetate, strontium acetate, sodium stearate, potassium stearate, sodium silicates, potassium silicates trisodium phosphate, tripotassium phosphate, etc. Free alkali and alkaline earth metals will react to produce an alkaline medium. The essential detail is that the charge to be hydrogenated should be in an alkaline medium.

Water may or may not be present in the charge to be hydrogenated, preferably absent. If water is to be present, it may be added separately or by means of an aqueous solution of the solvent or of the alkaline material. The azeotropic mixture of isopropanol and water cited in some of the examples contains about 88% isopropanol.

The hydrogen employed is preferably electrolytic hydrogen gas; however it may be obtained from any other source, and gases in which hydrogen is present, such as water gas, may be used.

The method for working up the hydrogenated charge for its benzidine and aniline content and for recovery of the solvent is not limited to the method used in Example I, but may be varied considerably. Other methods may be used; for example, those disclosed in the copending application Serial No. 203,814, filed April 23, 1938.

By the preceding methods benzidine sulfate of exceptionally high purity is obtainable with considerably more economy than by previous commercial methods. Yields up to 80% of theory of benzidine sulfate are obtainable with aniline as a valuable by-product. At least 85 to 95% of theory of useful products is obtainable. Instead of forming benzidine sulfate, the hydrochloride may be prepared by the addition of salt to "salt out" the hydrochloride; or the benzidine may be manufactured as the free amine by the addition of soda ash to the hydrochloride.

It is apparent that many widely different embodiments of this invention may be made without departing from the spirit and scope thereof and therefore it is not intended to be limited except as indicated in the appended claims.

We claim:
1. The process which comprises catalytically hydrogenating nitrobenzene in an alkaline medium and in an oxygen-containing non-acidic organic solvent having from 3 to 7 carbon atoms while in contact with a noble metal hydrogenation catalyst at a temperature within the range of 30° to 150° C.
2. The process in accordance with claim 1 characterized in that the organic solvent is an alcohol.
3. The process in accordance with claim 1 characterized in that the organic solvent is an aliphatic alcohol.
4. The process in accordance with claim 1 characterized in that the organic solvent is isopropanol.

CLYDE O. HENKE.
ROLAND GEORGE BENNER.
ROBERT C. W. JONES.